(12) United States Patent
Lei

(10) Patent No.: US 10,443,748 B2
(45) Date of Patent: Oct. 15, 2019

(54) ACTUATOR OF REGULATOR AND FLUID REGULATOR

(71) Applicant: FISHER JEON GAS EQUIPMENT (CHENGDU) CO., LTD., Chengdu, Sichuan (CN)

(72) Inventor: Yanwei Lei, Sichuan (CN)

(73) Assignee: FISHER JEON GAS EQUIPMENT (CHENGDU) CO., LTD., Chengdu (CN)

( * ) Notice: Subject to any disclaimer, the term of this patent is extended or adjusted under 35 U.S.C. 154(b) by 133 days.

(21) Appl. No.: 15/500,483

(22) PCT Filed: Jul. 28, 2015

(86) PCT No.: PCT/CN2015/085279
§ 371 (c)(1),
(2) Date: Jan. 30, 2017

(87) PCT Pub. No.: WO2016/015620
PCT Pub. Date: Feb. 4, 2016

(65) Prior Publication Data
US 2017/0211714 A1    Jul. 27, 2017

(30) Foreign Application Priority Data

Jul. 28, 2014 (CN) .................... 2014 2 0429009 U

(51) Int. Cl.
*G05D 16/06* (2006.01)
*F16K 17/04* (2006.01)
(Continued)

(52) U.S. Cl.
CPC ......... *F16K 17/04* (2013.01); *G05D 16/0655* (2013.01); *G05D 16/04* (2013.01); *G05D 16/0661* (2013.01); *Y10T 137/7821* (2015.04)

(58) Field of Classification Search
CPC ......... F16K 17/04; F16K 17/20; G05D 16/04; G05D 16/0655; G05D 16/0661;
(Continued)

(56) References Cited

U.S. PATENT DOCUMENTS 2,619,983 A * 12/1952 Roberts ................ F16K 31/165
137/116.5
3,086,548 A *  4/1963 Galiger .............. G05D 16/0613
137/116.5
(Continued)

FOREIGN PATENT DOCUMENTS

CN        2076631       5/1991
CN        1264827 A     8/2000
(Continued)

OTHER PUBLICATIONS

International Search Report and Written Opinion for PCT/CN2015/085279, dated Nov. 4, 2015.
(Continued)

*Primary Examiner* — William M McCalister
(74) *Attorney, Agent, or Firm* — Marshall, Gerstein & Borun LLP

(57) ABSTRACT

An actuator of a regulator is connected to one end of a valve rod. The actuator includes a shell, a limiting component, a diaphragm assembly, and an elastic element. The diaphragm assembly is movably sleeved on the valve rod. Further, the elastic element is coupled to the diaphragm assembly and is movably sleeved between the diaphragm assembly and a tip of one end of the valve rod, in a compressed state. An inner diameter of a portion of the limiting component is smaller than an outer diameter of an upper portion of the diaphragm assembly. The limiting component is located above the diaphragm assembly.

20 Claims, 9 Drawing Sheets

(51) Int. Cl.
*F16K 17/20* (2006.01)
*G05D 16/04* (2006.01)

(58) Field of Classification Search
CPC ......... Y10T 137/7812; Y10T 137/7818; Y10T 137/7819; Y10T 137/782; Y10T 137/7821
USPC ............ 137/505.29, 505.34, 505.35, 505.36, 137/505.37
See application file for complete search history.

(56) References Cited

U.S. PATENT DOCUMENTS

| | | | | |
|---|---|---|---|---|
| 7,165,573 | B2 * | 1/2007 | Gotthelf | G05D 16/0669 137/505.34 |
| 8,726,925 | B2 * | 5/2014 | Clifford | F16K 17/06 137/315.04 |
| 9,062,781 | B2 * | 6/2015 | Mevius | F16J 15/062 |
| 2007/0080309 | A1 | 4/2007 | Daake et al. | |
| 2008/0257418 | A1 * | 10/2008 | Kranz | G05D 16/0683 137/315.13 |
| 2009/0261281 | A1 * | 10/2009 | Mevius | F16K 31/165 251/118 |
| 2012/0241658 | A1 | 9/2012 | Clifford | |
| 2014/0174565 | A1 * | 6/2014 | Yunxia | F16K 17/04 137/505 |

FOREIGN PATENT DOCUMENTS

| | | |
|---|---|---|
| CN | 101446363 A | 6/2009 |
| CN | 201561169 | 8/2010 |
| CN | 201884742 | 6/2011 |
| CN | 204025703 | 12/2014 |
| WO | WO-2014/094656 A1 | 6/2014 |

OTHER PUBLICATIONS

International Preliminary Report on Patentability for PCT/CN2015/085279, dated Jan. 31, 2017.
Extended European Search Report for EP 15828177.4, dated Feb. 5, 2018.
Office Action issued in European Patent Application No. 15 828 177.4, dated Mar. 20, 2019.

* cited by examiner

ACTUATOR OF REGULATOR AND FLUID REGULATOR

FIELD OF THE DISCLOSURE

The present disclosure relates to the field of fluid control, and in particular, to an actuator of a regulator and a fluid regulator.

BACKGROUND

The pressure of fluid supplied by a universal fluid distribution system may vary with a system requirement, climate, a supply source, and/or other factors, and in order to meet the transportation requirement of most terminal devices, requiring the fluid to be in line with a predetermined pressure and at or lower than the maximum capacity of a fluid regulator, the fluid regulator is implemented in these distribution systems to ensure that the requirement of the terminal devices is met.

FIG. 1 shows a conventional fluid regulator 100. The fluid regulator 100 usually includes an actuator 12 and a regulator valve 14.

The regulator valve 14 has a fluid inlet 30 for receiving fluid from, for example, a fluid distribution system and a fluid outlet 34 for transporting the fluid to a terminal device. The regulator valve 14 includes a valve port 28 disposed between the fluid inlet 30 and the fluid outlet 34. The transportation of the fluid from the fluid inlet 30 to the fluid outlet 34 has to be conducted through the valve port 28. The regulator valve 14 further includes a valve rod 26 and a valve flap 32. The valve flap 32 is disposed at an end portion of one end of the valve rod 26, located in the regulator valve 14, and the valve flap 32 and the valve rod 26 can be connected to one another. The valve flap 32 is adapted to move between a closed position, engaging the valve port 28, and an open position, spaced from the valve port 28, and the valve rod 26 is used for driving the valve flap 32 to move between the closed position and the open position.

The actuator 12 is coupled to the regulator valve 14 to ensure that the pressure at the fluid outlet 34 of the regulator valve 14, that is, the outlet pressure, meets a desired outlet pressure. The actuator 12 and the regulator valve 14 are in communication with each other and fluid is allowed to flow through. The actuator 12 includes a control spring 22, a shell 24, a diaphragm 18, an upper tray 16, and a lower tray 20. The shell 24 and the diaphragm 18 define a hole cavity that is in communication with the fluid outlet 34 of the regulator 14 and can allow the fluid to flow through, and the diaphragm 18 is used for sensing the outlet pressure of the regulator valve 14. The control spring 22 is disposed in the shell 24, and engages with the upper tray 16 at the top of the diaphragm 18. Therefore, the desired outlet pressure is set based on the control spring 22. The diaphragm 18 is further coupled to the valve rod 26 of the regulator 14, and the upper tray 16, the diaphragm 18, and the lower tray 20 are connected together through the valve rod 26 and a valve rod nut 36. The diaphragm 18 drives the valve rod 26 to move based on the sensed pressure, and the valve rod 26 drives the valve flap 32 to move together, so as to control opening and closing of the regulator valve 14, thereby adjusting the pressure of the fluid outlet 34.

When the regulator works normally, the pressure of the fluid outlet 34 rises over the desired pressure of the outlet, the diaphragm 18 senses a relatively large pressure so as to drive the valve rod 26 of the regulator to move, thus driving the valve flap 32 to reach the closed position of the valve port 28 to seal the valve port. The regulator is closed to prevent the pressure of the fluid outlet from rising.

As the regulator is used over time, a sealing effect between the valve flap 32 and the valve port 28 may be reduced, leakage may occur when the regulator is closed, and at this point, the pressure of the fluid outlet 34 may rise all the time, and may even be equal to the inlet pressure, or the pressure of the fluid outlet 34 fluctuates in a too large range, for example, a water hammer phenomenon, such that the pressure of the fluid outlet 34 suddenly rises. At this point, the force generated by the pressure of the fluid outlet 34 and acting on the diaphragm 18 may be completely transferred to the valve rod 26, the valve flap 32, and the valve port 28 of the valve element assembly, applying an extremely large stress to the valve rod, the valve flap, and the valve port, which may cause the valve rod, the valve flap, and the valve port to be deformed or even damaged so as to be dangerous.

Therefore, an actuator of a regulator and a fluid regulator are provided to prevent the valve element assembly from being deformed and damaged due to extremely large stress.

SUMMARY

In accordance with a first exemplary aspect of the present disclosure, an actuator of a regulator is provided. The actuator is connected to one end of a valve rod of the regulator. The actuator includes a shell, a limiting component disposed on an inner wall of the shell, a diaphragm assembly accommodated in the shell and movably sleeved on the valve rod, and an elastic element accommodated in the shell and coupled to the diaphragm assembly. The elastic element is movably sleeved, on the valve rod in a compressed state, between the diaphragm assembly and the tip of one end of the valve rod. An inner diameter of a portion of the limiting component that makes contact with the shell is smaller than an outer diameter of an upper portion of the diaphragm assembly, and the limiting component is located above the diaphragm assembly.

In accordance with a second exemplary aspect of the present disclosure, a fluid regulator is provided. The fluid regulator includes an actuator. The actuator is connected to one end of a valve rod of the regulator. The actuator includes a shell, a limiting component disposed on an inner wall of the shell, a diaphragm assembly accommodated in the shell and movably sleeved on the valve rod, and an elastic element accommodated in the shell and coupled to the diaphragm assembly. The elastic element is movably sleeved, on the valve rod in a compressed state, between the diaphragm assembly and the tip of one end of the valve rod. An inner diameter of a portion of the limiting component that makes contact with the shell is smaller than an outer diameter of an upper portion of the diaphragm assembly, and the limiting component is located above the diaphragm assembly.

In further accordance with any one or more of the foregoing first and second aspects, the actuator or the fluid regulator may further include any one or more of the following preferred forms.

In one preferred form, the limiting component is a protruding portion or a reinforcing rib.

In another preferred form, the diaphragm assembly includes a diaphragm, an upper tray and a lower tray fixed to upper and lower sides of the diaphragm, respectively, and the upper portion of the diaphragm assembly is the upper tray.

In another preferred form, the lower tray has an inverted T-shape in cross-section, a central through hole is disposed in the lower tray, the diaphragm and the upper tray are fixedly sleeved on an outer side of the central through hole, and the diaphragm assembly is movably sleeved on an outer side of one end of the valve rod via the central through hole.

In another preferred form, a boss is disposed on the valve rod, an upper portion of the boss is located in the shell and on a lower side of the diaphragm assembly, and the lower tray is in contact with the boss.

In another preferred form, a groove that accommodates the boss is disposed on the lower tray.

In another preferred form, the actuator further includes a sealing element disposed between the valve rod and the diaphragm assembly. The sealing element may be accommodated in a groove disposed on the valve rod or accommodated in the groove disposed on the lower tray.

In another preferred form, the sealing element is a rubber component or an elastic component made of metal.

In another preferred form, the elastic element is a spring or a component made of rubber.

In another preferred form, the fluid regulator further includes a valve coupled to the actuator. The valve includes a valve body a fluid channel passing through the valve body and having an inlet and an outlet, a valve rod, a valve port defined in the fluid channel, and a valve flap disposed in the valve body.

Through the actuator of the regulator and the fluid regulator provided in the present disclosure, an elastic element is movably sleeved on one end of the valve rod, and the elastic element is coupled to a diaphragm assembly, which, in combination with a limiting structure between the upper portion of the diaphragm assembly and the limiting component enables the valve rod to be subject to a downward buffering force through the elastic element while the valve rod is subject to upward stress when the fluid outlet generates a large stress. That is, the valve rod buffers the upward stress to a certain extent. In addition, because the valve element assembly consists of a valve rod, a valve flap, and a valve port, when the valve rod buffers the stress to a certain extent, the stress applied to the valve flap and the valve port is also reduced. Thus, the actuator of the regulator and the fluid regulator disclosed herein solves the issue of the valve rod, the valve flap, and the valve port of the valve element assembly being deformed and even damaged due to extremely large stress at the fluid outlet. Thus, the valve element assembly is protected even when the stress at the fluid outlet is great.

DETAILED DESCRIPTION OF THE DRAWINGS

Figure 1:
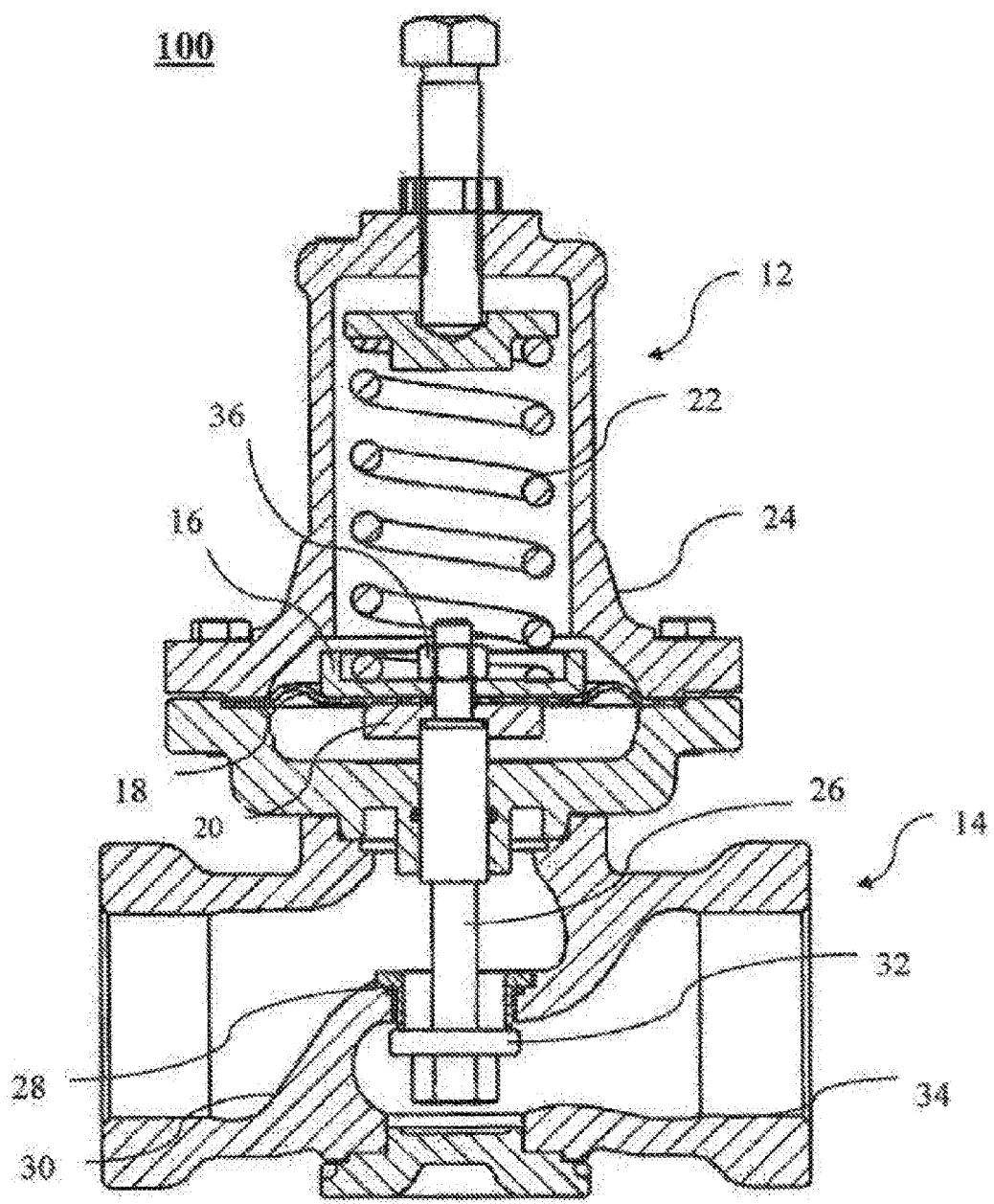
FIG. 1 is a cross-sectional view of a conventional fluid regulator.
Figure 2:
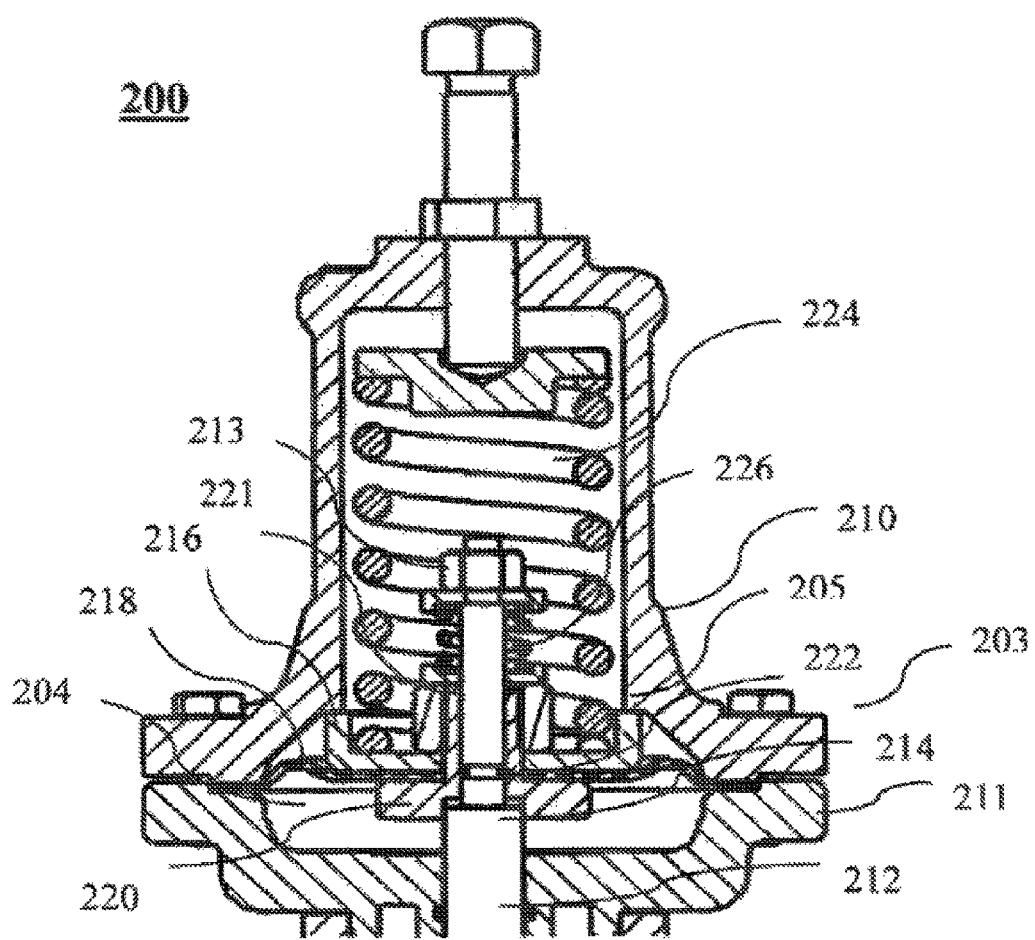
FIG. 2 is a cross-sectional view of an actuator of a regulator constructed in accordance with the teachings of the present disclosure.

FIG. 2 is a cross-sectional view of an actuator 200 of a regulator constructed in accordance with the teachings of the present disclosure. The actuator 200 includes a shell 203, a limiting component 205 located on an inner wall of the shell 203, and a diaphragm assembly 204 disposed in the shell 203. The limiting component 205 is located above the diaphragm assembly 204, and the actuator 200 is connected to one end of a valve rod of the regulator. The shell 203 includes a spring sleeve 210 and a lower membrane cover 211.

Figure 7:
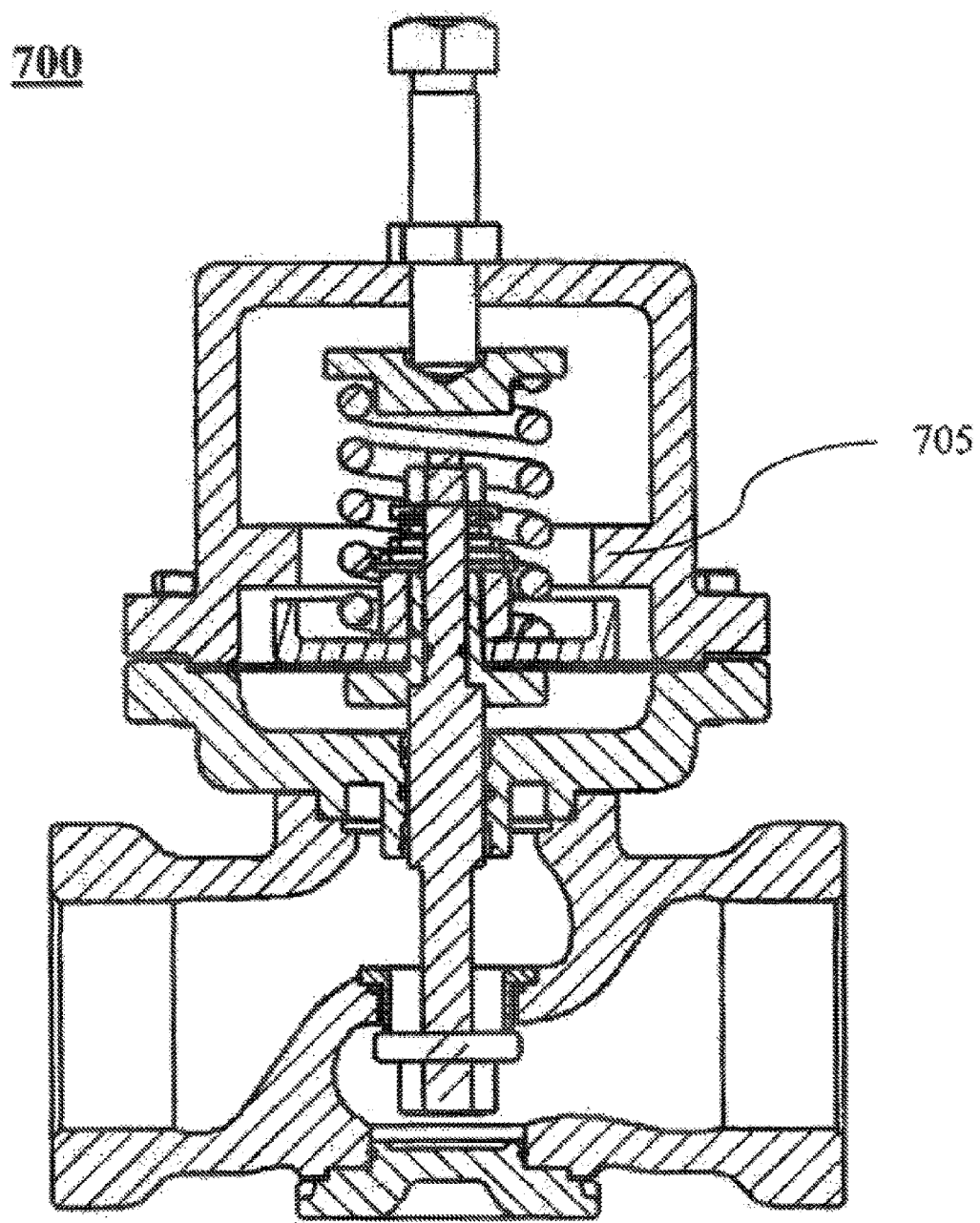
FIG. 7 is a cross-sectional view of another fluid regulator constructed in accordance with the teachings of the present disclosure.
Figure 8:
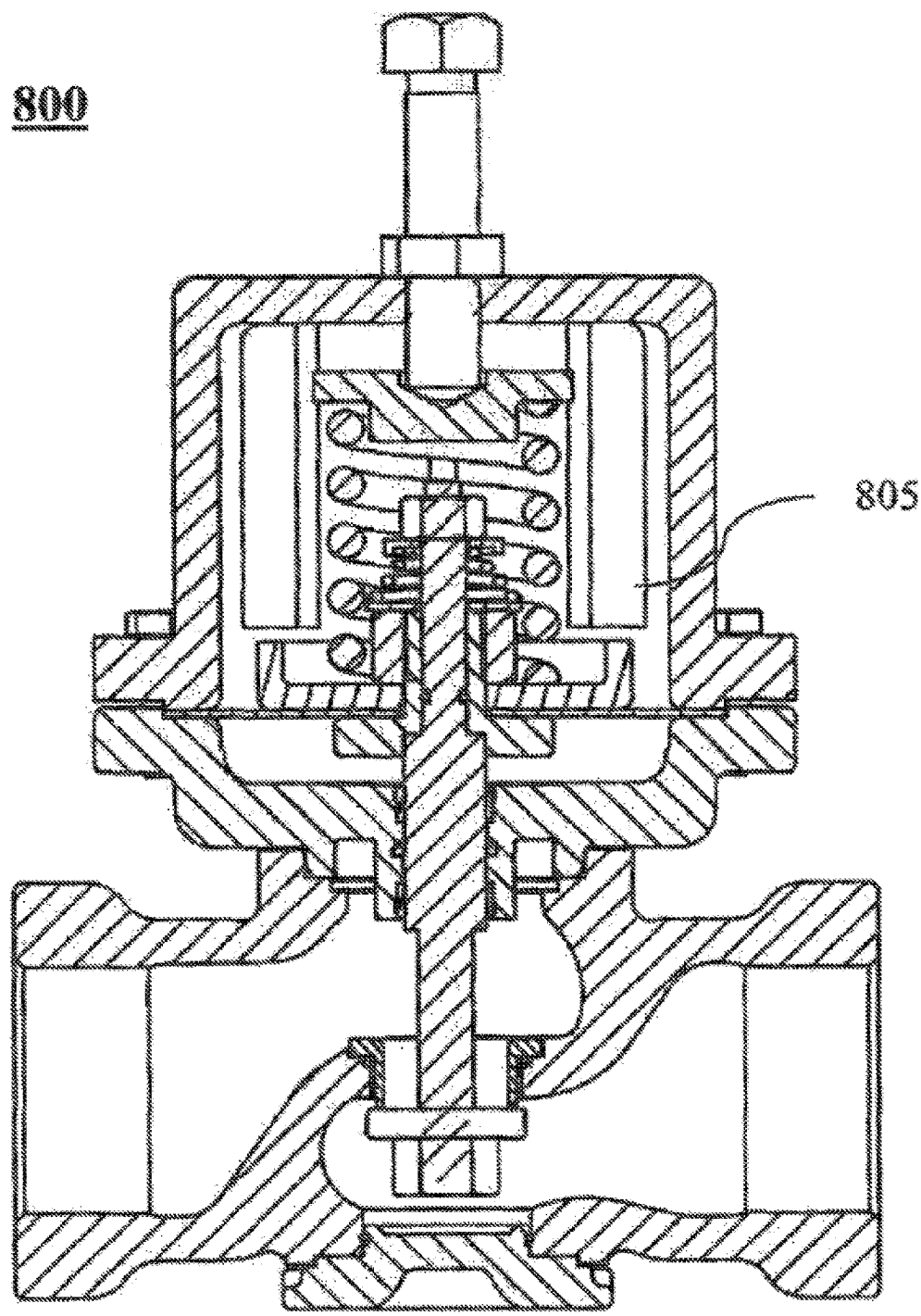
FIG. 8 is a cross-sectional view of another fluid regulator constructed in accordance with the teachings of the present disclosure.
Figure 9:
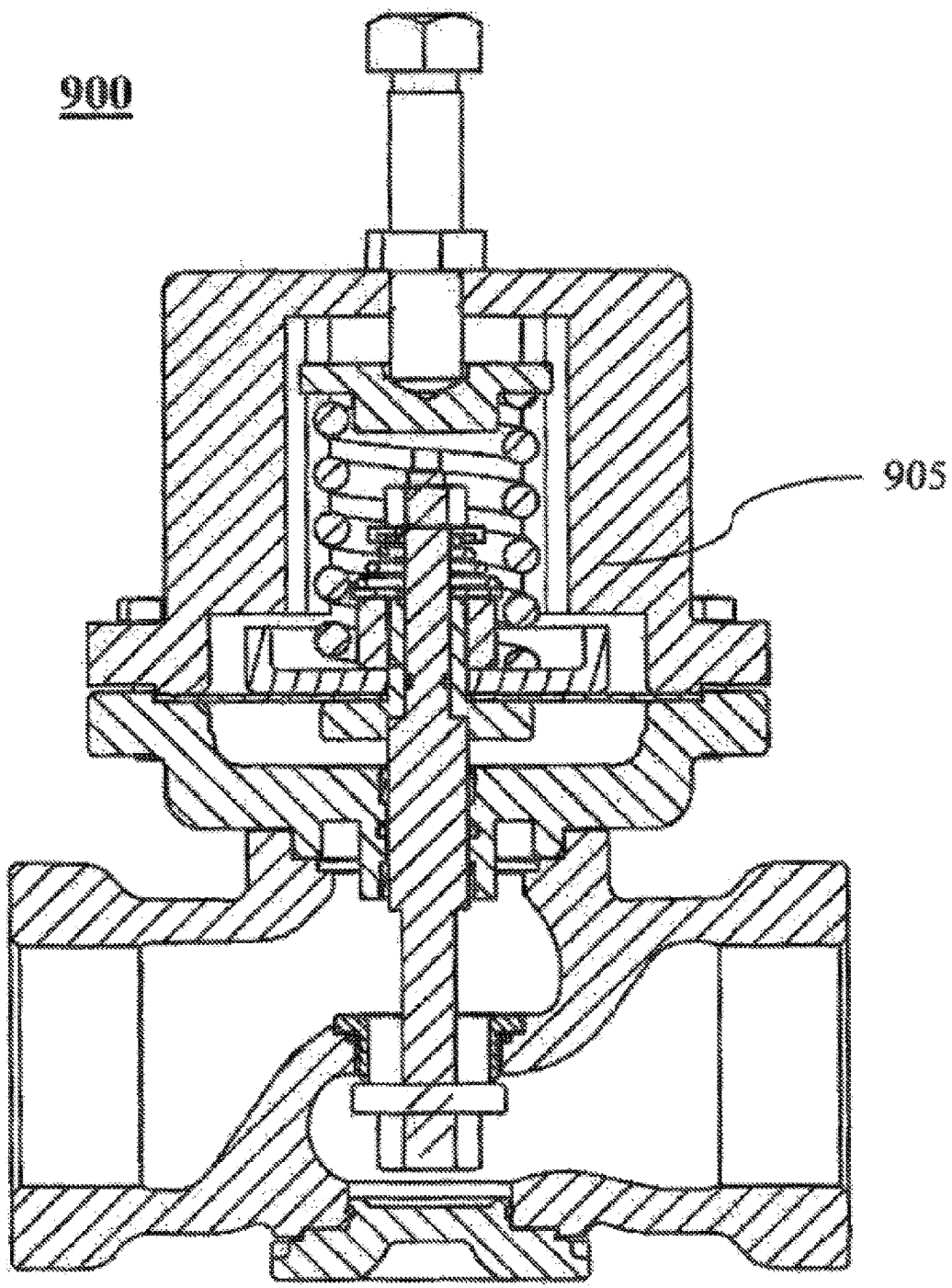
FIG. 9 is a cross-sectional view of another fluid regulator constructed in accordance with the teachings of the present disclosure.

The limiting component 205 is located on the inner wall of the shell 203, and located above the diaphragm assembly 204 (in the direction shown in FIG. 2). Preferably, the limiting component 205 is located on an inner wall of the spring sleeve 210. Preferably, the limiting component 205 may be a protruding portion located on the inner wall of the shell 203, or a reinforcing rib. In one example, the protruding portion may be a protruding portion formed by changing the size of the inner diameter of the shell 203, as with the limiting component 205 shown in FIG. 2. In another example, the protruding portion may also be a protruding portion located on the inner wall of the shell 203 and extending from the inner wall of the shell 203 to the direction of the axis of the shell 203, as with the limiting component 705 shown in FIG. 7. The reinforcing rib may, in some examples, be a component located on the inner wall of the shell 203 and extending downwards along a sidewall of the shell 203 (in the direction shown in FIG. 8 and FIG. 9); the component may be columnar, strip-like, or ribbed. In other examples, the reinforcing rib may also be a component extending downwards from the top of the inner wall of the shell 203 (in the direction shown in FIG. 8 and FIG. 9); the component may be columnar, strip-like, or ribbed. In the example illustrated in FIG. 8, the limiting structure 805 has six reinforcing ribs, and in the example illustrated in FIG. 9, the limiting structure 905 has eight reinforcing ribs. It will be appreciated that one of ordinary skill in the art may set the protruding portion or reinforcing rib according to actual needs.

The diaphragm assembly 204 is located in the shell 203, and the diaphragm assembly 204 includes a diaphragm 218, an upper tray 216, and a lower tray 220. The diaphragm 218 is fixedly mounted in the shell 203, and the upper tray 216 and the lower tray 220 are fixedly connected to upper and lower sides of the diaphragm 218 respectively, to form a sub-assembly. That is, the diaphragm assembly 204 is integrally connected.

A gap exists between the limiting component 205 and the diaphragm assembly 204 in the vertical direction (in the direction shown in FIG. 2), allowing the diaphragm assembly 204 to move upwards (in the direction shown in FIG. 2) within a range. That is, the diaphragm assembly 204 can move towards or closer to the limiting component 205. The inner diameter of the portion of the limiting component 205 that makes contact with the shell 203 is smaller than the outer diameter of the upper portion of the diaphragm assembly, and the upper portion of the diaphragm assembly 204 may be the upper tray 216.

The diaphragm assembly 204 is movably sleeved on one end of the valve rod 212 cooperating with the actuator 200, and the diaphragm assembly 204 and the valve rod 212 may move relatively. A boss 214 is disposed on the valve rod 212, and an upper portion of the boss 214 is located in the shell 203 and on a lower side of the diaphragm assembly 204. That is, as shown in FIG. 2, the upper portion of the boss 214 may be located in a cavity defined by the diaphragm 218 and the lower membrane cover 211. In some examples, the boss 214 may be coaxial with the valve rod 212. In other examples, the boss 214 may not be coaxial with the valve rod 212. Moreover, the diaphragm assembly 204 is in contact with the boss 214 on the valve rod 212. Specifically, the lower tray 220 of the diaphragm assembly 204 is in contact with the boss 214 on the valve rod 212. In one example, a groove that accommodates the boss 214 is disposed on the lower tray 220.

The actuator 200 further includes an elastic element 226 disposed in the shell 203. The elastic element 226 is coupled to the diaphragm assembly 204, and is disposed between the diaphragm assembly 204 and the tip of one end of the valve rod 212. The tip of one end of the valve rod 212 may be a valve rod nut 213, and the elastic element 226 is movably sleeved on the valve rod in a compressed state, at least initially. Moreover, the elastic force of the elastic element 226 should meet a closing force required by a product. That is, the elastic force of the elastic element 226 should ensure that the valve port (not shown in FIG. 2), which is opened or closed by driving a valve flap connected to the valve rod 212 via the valve rod 212, can be closed normally.

Specifically, the elastic element 226 is, in a compressed state, movably sleeved on one end of the valve rod 212 cooperating with the diaphragm assembly 204. An upper end of the elastic element 226 may abut against the valve rod nut 213, and a lower end of the elastic element 226 is coupled to an upper side of the diaphragm assembly 204. The elastic element 226 may be a spring, in some examples, or a component made of rubber, in other examples. Preferably, the elastic element 226 may be a universal helical spring, a Belleville spring, a conical spring or a component made of rubber, as shown in FIG. 2.

A sealing element 222 is disposed between the valve rod 212 and the diaphragm assembly 204. A groove that accommodates the sealing element 222 is disposed on the valve rod 212 or on the lower tray 220. The groove may be ring-like. The valve rod 212 and the diaphragm assembly 204 may be dynamic sealing structures. The sealing element 222 is preferably a rubber component (for example, an O ring) or an elastic component made of metal. More preferably, the sealing element 222 may be a metal C ring or a metal O ring.

Preferably, the lower tray 220 may have an inverted T-shape in cross-section. A central through hole 221 is disposed in the lower tray 220, with the diaphragm 218 and the upper tray 216 fixedly sleeved on an outer side of the central through hole 221 of the lower tray 220. Further, the diaphragm assembly 204 is movably sleeved on an outer side of one end of the valve rod 212 via the central through hole 221 of the lower tray 220 and, finally, the diaphragm assembly 204 may fasten, through a nut, the diaphragm 218 and the upper tray 216 that are sleeved on the lower tray 220 to the lower tray 220, thereby creating a fixed connection.

During operation of the actuator 200, the diaphragm assembly 204 may move relative to the shell 203. When the diaphragm 218 is subject to an upward pressure in the upward direction (when viewed in FIG. 2), the diaphragm assembly 204 moves upwards in the upward direction, and at the same time, compresses the elastic element 226. That is, the elastic element 226 is continuously compressed from an initial state, until the upper tray 216 makes contact with the limiting component 205 on the inner wall of the shell 203. The inner diameter of the portion of the limiting component 205, which makes contact with the shell 203, is smaller than the outer diameter of the upper portion of the diaphragm assembly 205. That is, the inner diameter of the portion of the limiting component 205 is smaller than the outer diameter of the upper tray 216. Finally, the limiting component 205 is located above the diaphragm assembly 204 and limits upward movement of the diaphragm assembly 204.

When the diaphragm 218 senses that the upward pressure shown in FIG. 2 exceeds an allowable pressure, the pressure acts on the diaphragm assembly 204. The diaphragm assembly 204 (i.e., the upper tray 216, the diaphragm 218, and the upper tray 220) then moves upwards relative to the valve rod 212 and the shell 203 in the direction shown in FIG. 2, and at the same time, the elastic element 226 is compressed, until the upper tray 216 of the diaphragm assembly 204 makes contact with the limiting component 205 on the inner wall of the shell 203. At this point, the valve element assembly is limited, i.e., the valve rod 212, the valve flap, and the valve port form a limiting structure. In this process, as there is relative movement between the valve rod 212 and the diaphragm assembly 204, a gap may be generated between the boss 214 of the valve rod 212 and the lower tray 220. As the sealing element 222 is disposed between the valve rod 212 and the diaphragm assembly 204 and the sealing element 222 is disposed in a ring-like groove on the valve rod 212 or the lower tray 220, leakage is prevented. Due to the limiting structure between the diaphragm assembly 204 and the shell 203, an extremely large force may act on the limiting component 205 on the inner wall of the shell 203 via the diaphragm assembly 204 and the upper tray 216. Between the valve rod 212 and the diaphragm assembly 204, there is a dynamic sealing structure—the valve element assembly, i.e., the valve rod 210, the valve flap, and the valve port, is only subject to the force generated when the elastic element 226 is compressed, so that the force applied to the valve element assembly is buffered, thereby protecting the valve rod 212, the valve flap, and the valve port of the valve element assembly from damage that would otherwise occur due to extremely large forces.

The actuator further includes a biasing component 224 disposed in the shell 203, coupled to the diaphragm assembly 204, and configured to apply a biasing force to the valve rod 212 via the diaphragm assembly 204. Specifically, the biasing component 224 may be a spring, with an upper end of the spring fixed to the spring sleeve 210 of the shell 203 and a lower end of the spring coupled to an upper side of the diaphragm assembly 204.

Figure 3:
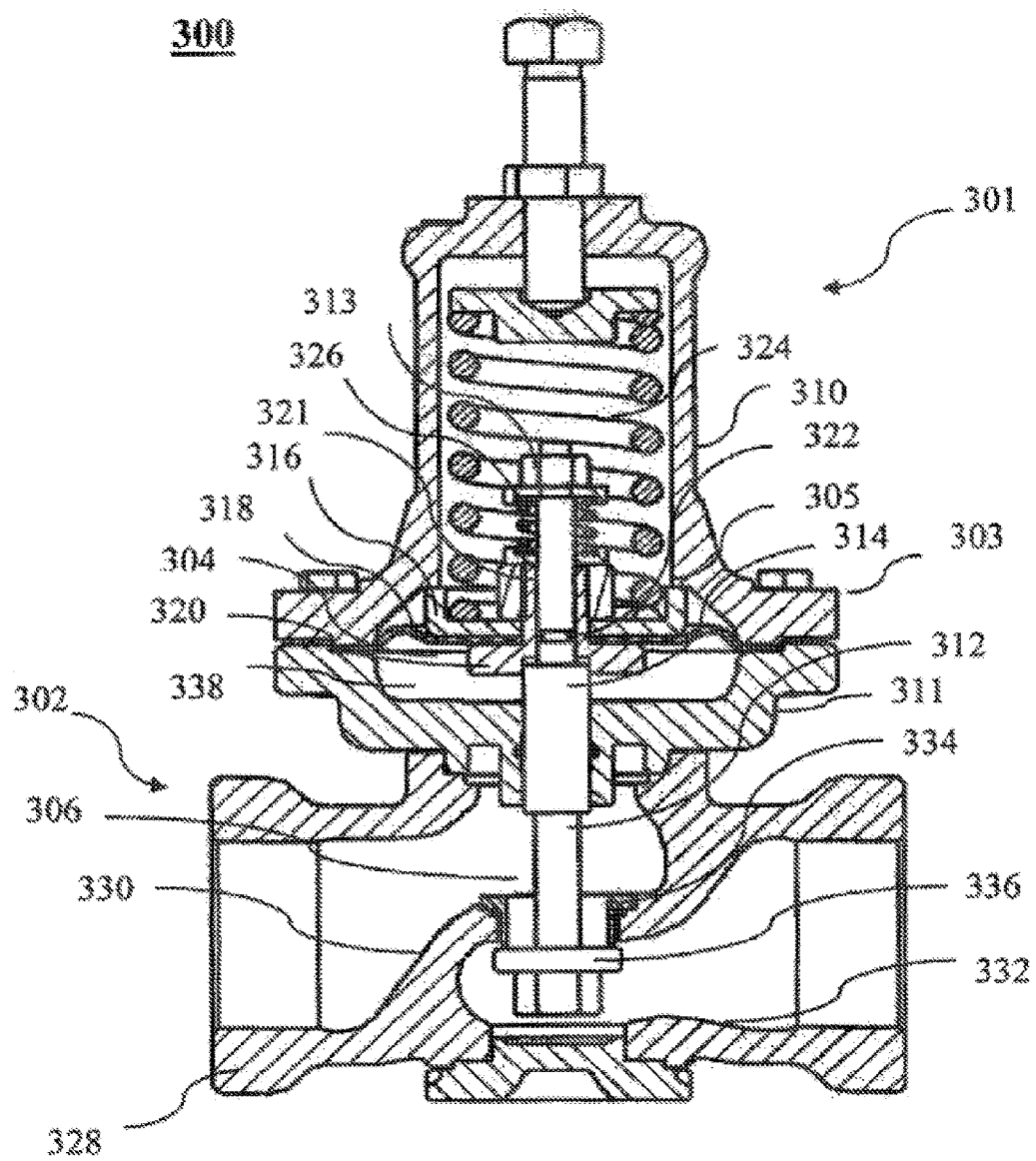
FIG. 3 is a cross-sectional view of a fluid regulator constructed in accordance with the teachings of the present disclosure.

FIG. 3 is a cross-sectional view of a fluid regulator 300 constructed in accordance with the teachings of the present disclosure. The fluid regulator 300 may include an actuator 301 and a valve 302.

In this example, the valve 302 includes a valve body 328, a valve element assembly 306, and a fluid channel defined by a fluid inlet 330 and a fluid outlet 332 on the valve body 328. The fluid channel is defined as passing through the valve body 328. The valve element assembly 306 includes a valve rod 312, a valve port 334, and a valve flap 336. The valve port 334 is defined between the fluid inlet 330 and the fluid outlet 332 of the fluid channel, and the fluid flows between the fluid inlet 330 and the fluid outlet 332 through the valve port 334. The valve flap 336 is disposed in the fluid channel and connected to the valve rod 312, and the valve rod 312 is used for driving the valve flap 336 to move between a closed position, in engagement with the valve port 334, and an open position, spaced from the valve port 334.

The actuator 301 is coupled to the valve 302. The actuator 301 includes a shell 303, a diaphragm assembly 304 accommodated in the shell 303, and a limiting component 305 located on an inner wall of the shell 303. The shell 303 includes a spring sleeve 310 and a lower membrane cover 311. The limiting component 305 is located on the inner wall of the shell 303, and located above the diaphragm assembly 304 (in the direction as shown in FIG. 3). In one example, the limiting component 305 is located on an inner wall of the spring sleeve 310.

Preferably, the limiting component 305 may be a protruding portion located on the inner wall of the shell 303, and may also be a reinforcing rib. In some examples, the protruding portion may be a protruding portion formed by changing the size of the inner diameter of the shell 303, as with the limiting component 305 shown in FIG. 3. Further, the protruding portion may also be a protruding portion located on the inner wall of the shell 303 and extending from the inner wall of the shell 303 along the direction of the axis of the shell 303, as with the limiting component 705 shown in FIG. 7. The reinforcing rib may be a component located on the inner wall of the shell 303 and extending downwards along a sidewall of the shell (in the direction shown in FIG. 8 and FIG. 9); the component may be columnar, strip-like, or ribbed. In other examples, the reinforcing rib may also be a component extending downwards from the top of the inner wall of the shell (in the direction shown in FIG. 8 and FIG. 9); the component may be columnar, strip-like, or ribbed. It will be appreciated that those having ordinary skill in the art may set the protruding portion or reinforcing rib according to actual needs.

The diaphragm assembly 304 is located in the shell 303, and the diaphragm assembly 304 includes a diaphragm 318, an upper tray 316, and a lower tray 320. The diaphragm 318 is fixedly mounted in the shell 303, and the upper tray 316 and the lower tray 320 are fixedly connected to upper and lower sides of the diaphragm 318 respectively, to form a sub-assembly, i.e., the diaphragm assembly 304 is integrally connected.

A gap is formed between the limiting component 305 and the diaphragm assembly 304 in the vertical direction (at least when viewed in FIG. 3), which allows the diaphragm assembly 304 to move upwards (in FIG. 3) within a range, i.e., move towards or closer to the limiting component 305. The inner diameter of the portion of the limiting component 305 that makes contact with the shell 303 is smaller than the outer diameter of the upper portion of the diaphragm assembly 304 and the upper portion of the diaphragm assembly 304 may be the upper tray 316.

The diaphragm assembly 304 is movably sleeved on the valve rod 312, and the diaphragm assembly 304 and the valve rod 312 may move relatively. A boss 314 is disposed on the valve rod 312, and an upper portion of the boss 314 is located in the shell 303 and on a lower side of the diaphragm assembly 304. That is, as shown in FIG. 3, the upper portion of the boss 314 may be located in a cavity defined by the diaphragm 318 and the lower membrane cover 311. The boss 314 may be coaxial with the valve rod 312, in examples, and may not be coaxial with the valve rod, in other examples. Moreover, the boss 314 is in contact with the lower tray 320 of the diaphragm assembly 304. In one example, a groove that accommodates the boss 314 is disposed in the lower tray 320.

During operation of the fluid regulator 300, the diaphragm assembly 304 may move relative to the shell 303. The diaphragm 318 and the lower membrane cover 311 of the shell 303 define a hole cavity 338. The hole cavity 338 is in communication with the fluid outlet 332 and can allow the fluid to flow through, such that the diaphragm 318 senses the pressure of the fluid outlet of the valve 302. When the diaphragm 318 senses, through the hole cavity 338, an extremely large pressure caused by leakage or a water hammer phenomenon of the valve port 334 (i.e., the diaphragm 318 is subject to upward pressure and the diaphragm assembly 304 moves upwards) the diaphragm assembly 304 moves upwards until the upper tray 316 makes contact with the limiting component 305 on the inner wall of the shell 303 and the diaphragm assembly 304 and the limiting component 305 form a limiting structure. Specifically, the inner diameter of the portion of the limiting component 305 that makes contact with the shell 303 is smaller than the outer diameter of the upper portion of the diaphragm assembly 304. The upper portion of the diaphragm assembly 304 may be the upper tray 316.

An elastic element 326 is disposed in the shell 303. The elastic element 326 is coupled to the diaphragm assembly 304, and disposed between the diaphragm assembly 304 and the tip of one end of the valve rod 312. The tip of one end of the valve rod 312 may be a valve rod nut 313, and the elastic member 326 is movably sleeved on the valve rod 312 in a compressed state, at least initially. Moreover, the elastic force of the elastic element 326 should meet a closing force required by a product. That is, the elastic force of the elastic element 326 should ensure that the valve port 334 can be closed normally. Specifically, an upper end of the elastic element 326 may abut against the valve rod nut 313, and a lower end of the elastic element 326 is coupled to an upper side of the diaphragm assembly 304, so that the elastic element 326 is movably sleeved on one end of the valve rod 312 cooperating with the diaphragm assembly 304. That is, the elastic element 326 is movably sleeved on the valve rod 312, and compressed between the valve rod nut 313 and the diaphragm assembly 304. The elastic element 326 may be a spring, in some examples, or a component made of rubber, in other examples. Preferably, the elastic element 326 may be a universal helical spring, a Belleville spring, a conical spring or a component made of rubber.

A sealing element 322 is disposed between the valve rod 312 and the diaphragm assembly 304. The valve rod 312 and the diaphragm assembly 304 form a dynamic sealing structure. A groove that accommodates the sealing element 322 is disposed in the valve rod 312 or in the lower tray 320. The groove may be ring-like, in some examples. The sealing element 322 is preferably a rubber component (for example, an O ring) or an elastic component made of metal. More preferably, the sealing element 322 may be a metal C ring, or may be a metal O ring.

Preferably, the lower tray 320 may have an inverted T-shape in cross-section and be provided with a central through hole 321. The diaphragm 318 and the upper tray 316 are fixedly sleeved on an outer side of the central through hole 321 of the lower tray 320. The diaphragm assembly 304 is movably sleeved on an outer side of one end of the valve rod 312 via the central through hole 321 of the lower tray 320, and the fixed connection of the diaphragm assembly 304 may fasten, through a nut, the diaphragm 318 and the upper tray 316 that are sleeved on the lower tray 320 to the lower tray.

The actuator 300 further includes a biasing component 324 disposed in the shell 303, coupled to the diaphragm assembly 304, and configured to apply a biasing force to the valve rod 312 via the diaphragm assembly 304. Specifically, the biasing component 324 may be a spring, with an upper end of the spring fixed onto the shell 303 and a lower end of the spring coupled to an upper side of the diaphragm assembly 304.

During operation of the fluid regulator 300, when the valve flap 336 is opened, the fluid flows from the fluid inlet 330 to the fluid outlet 332, via the valve port 334. At this point, the pressure at the fluid outlet 332 rises. When the pressure at the fluid outlet 332 exceeds the desired pressure, the valve flap 336 and the valve port 334 are sealed in a contact mode to prevent the pressure at the fluid outlet 332 from rising.

However, as the fluid regulator 300 operates over time, a sealing effect between the valve flap 336 and the valve port 334 may be reduced and leakage may occur when the fluid regulator 300 is closed At this point, the pressure at the fluid outlet 332 may rise continuously and may even be equal to the pressure at the fluid inlet 330. Alternatively, the pressure at the fluid outlet 332 may fluctuate in too large of a range, for example, a water hammer phenomenon, such that the pressure at the fluid outlet 332 suddenly rises and the rising pressure acts on the diaphragm 318 via the hole cavity 338. At this point, the diaphragm assembly 304 moves upwards in the direction shown in FIG. 3 relative to the valve rod 312 and the spring sleeve 310 of the shell 303, and, at the same time, the elastic element 326 is compressed. That is, the elastic element 326 is continuously compressed from its initial compressed state until the diaphragm assembly 304 moves upwards in the direction shown in FIG. 3 and the upper tray 316 makes contact with the limiting component 305. The inner diameter of the portion of the limiting component 305 that makes contact with the shell 303 is smaller than the outer diameter of the upper portion of the diaphragm assembly 304, and the upper portion (when viewed in FIG. 3) of the diaphragm assembly 304 may be the upper tray 316, so that the diaphragm assembly 304 is limited. Preferably, the elastic element 326 may be a spring or a component made of rubber.

When the diaphragm assembly 304 moves upwards relative to the valve rod 312, a gap may be generated between the boss 314 of the valve rod 312 and the lower tray 320. As the sealing element 322 is disposed between the valve rod 312 and the diaphragm assembly 304, and the sealing element 322 is disposed in the ring-like groove on the valve rod, leakage is prevented. Therefore, during operation of the fluid regulator, an extremely large force generated due to sudden rise of the pressure at the fluid outlet 332 may act on the limiting component 305 via the diaphragm assembly 304, and the valve rod 312, the valve flap 336, and the valve port 334 of the valve element assembly 306 are only subject to the force generated by compression on the elastic element 326 in the process, so that the force (stress) applied to the valve element assembly 306 is buffered, thereby protecting the valve rod 312, the valve flap 336, and the valve port 334 of the valve element assembly from being damaged due to extremely large force (stress).

Figure 4:
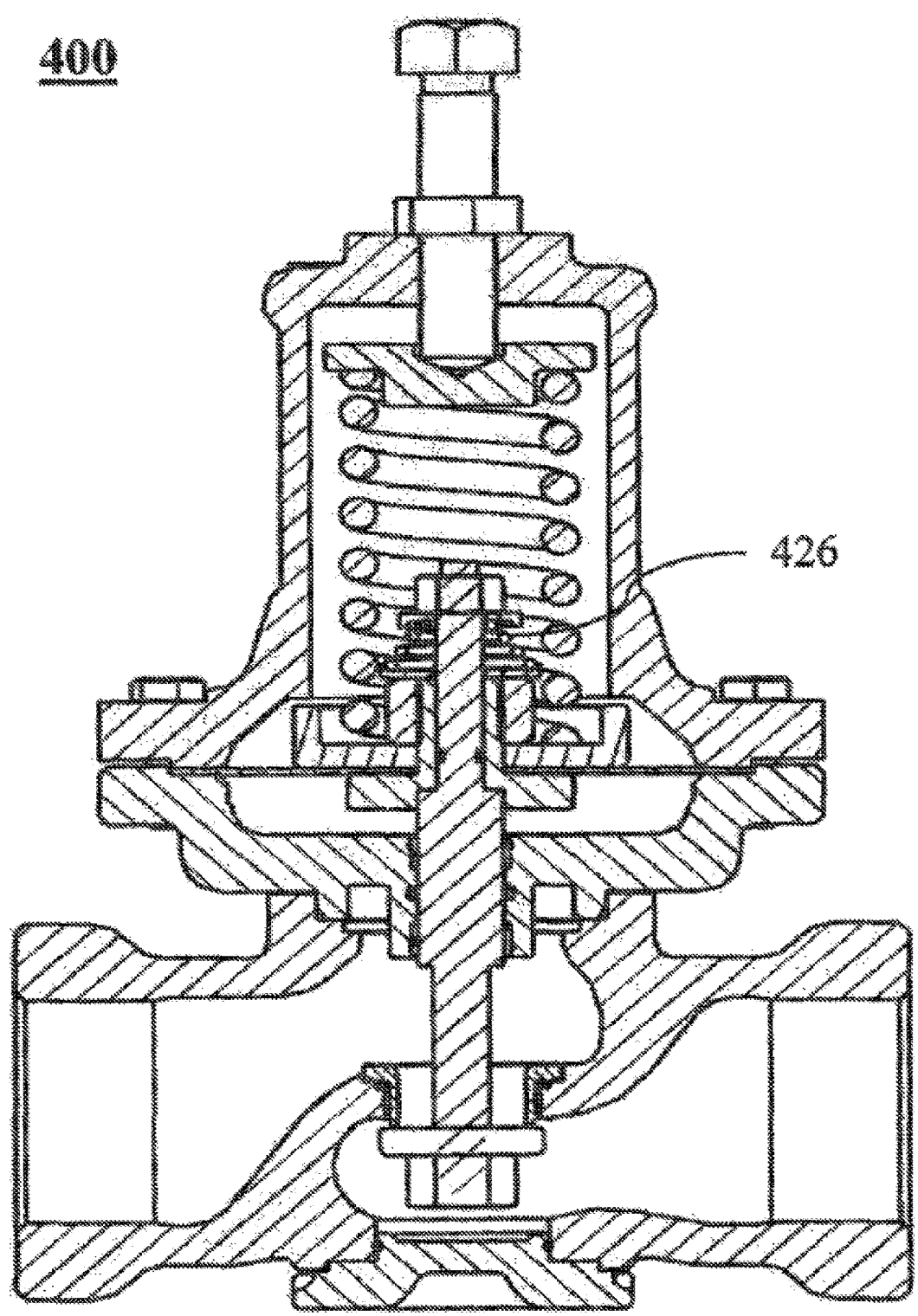
FIG. 4 is a cross-sectional view of another fluid regulator constructed in accordance with the teachings of the present disclosure.
Figure 5:
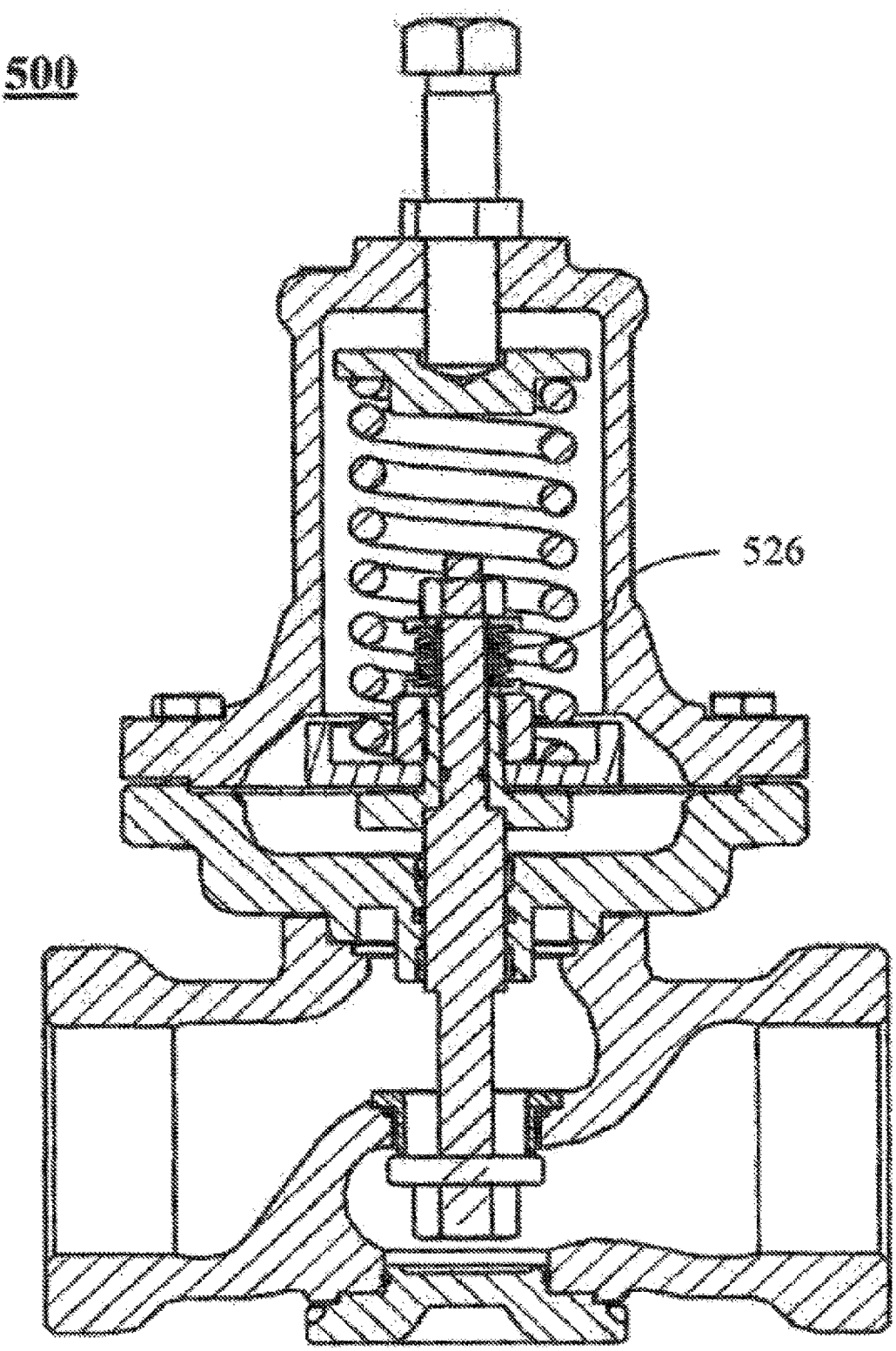
FIG. 5 is a cross-sectional view of another fluid regulator constructed in accordance with the teachings of the present disclosure.
Figure 6:
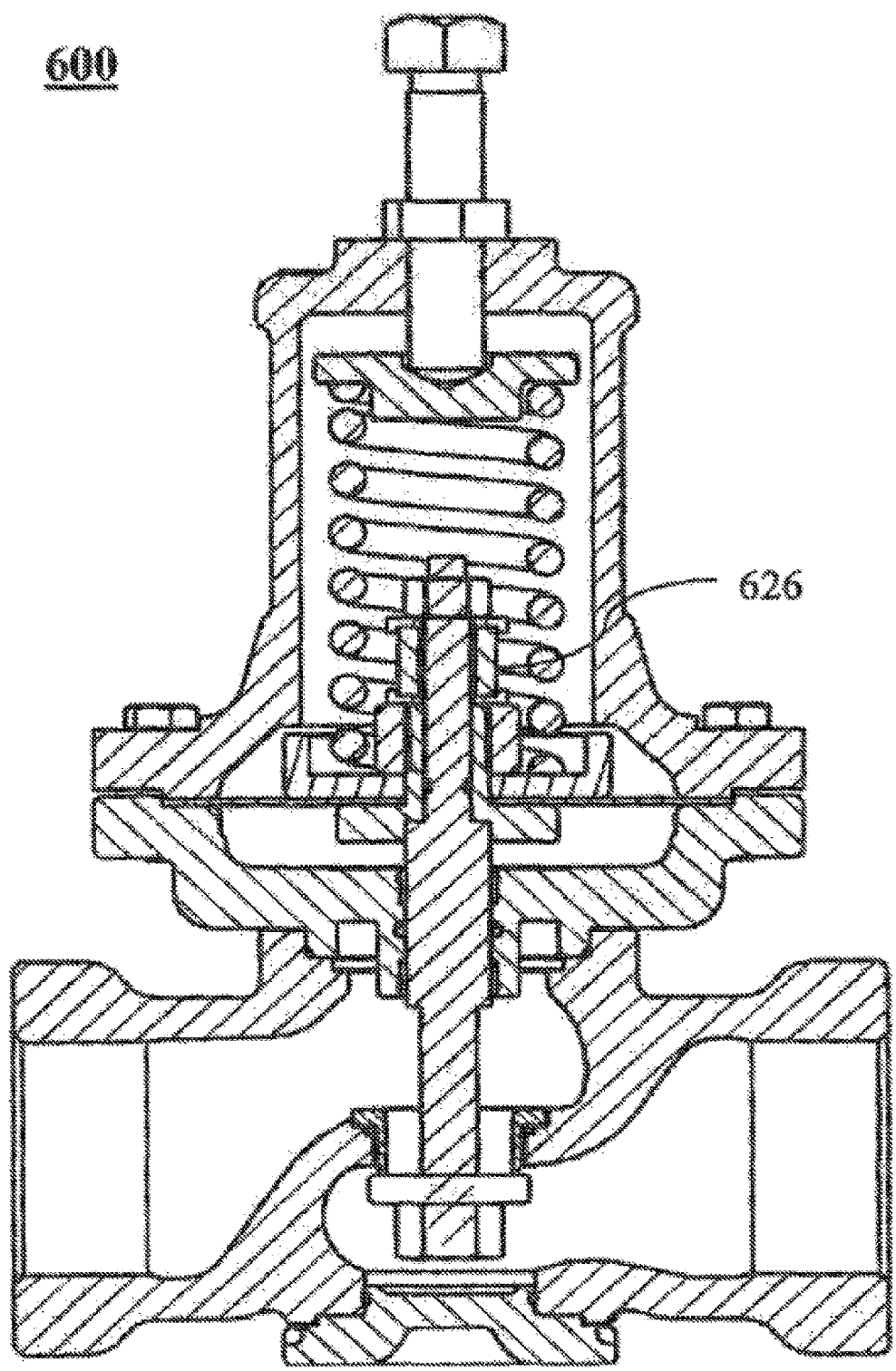
FIG. 6 is a cross-sectional view of another fluid regulator constructed in accordance with the teachings of the present disclosure.

FIG. 4 is a cross-sectional view of a fluid regulator 400 constructed in accordance with the teachings of the present disclosure, wherein the elastic element 426 in the fluid regulator 400 is a conical spring. FIG. 5 is a cross-sectional view of a fluid regulator 500 constructed in accordance with the teachings of the present disclosure, wherein the elastic element 526 in the fluid regulator 500 is a Belleville spring. FIG. 6 is a cross-sectional view of a fluid regulator 600 constructed in accordance with the teachings of the present disclosure, wherein the elastic element 626 in the fluid regulator 600 is an elastic rubber block. It should be noted that the fluid regulators shown in FIG. 4, FIG. 5, and FIG. 6 may employ the same elements and operate in an identical or similar manner as the fluid regulator 300.

It should also be noted that, herein, the terms "include", "comprise", or any variants thereof are intended to cover a non-exclusive inclusion, such that a process, a method, an article, or a device that includes a series of elements not only includes such elements but also includes other elements not expressly specified, or may further include inherent elements of the process, method, article, or device. In the absence of more restrictions, an element limited by "include a/an . . . " does not exclude other same elements existing in the process, method, article, or device that includes the element.

The above descriptions are merely preferred exemplary aspects and exemplary forms of the present disclosure, but are not intended to limit the protection scope of the present disclosure. Any modification, equivalent replacement, improvement and the like made are all included in the protection scope of the present disclosure.

The invention claimed is:

1. An actuator of a regulator, the actuator being connected to one end of a valve rod, wherein the actuator comprises:
   a shell;
   a limiting component, the limiting component being disposed on an inner wall of the shell;
   a diaphragm assembly disposed in the shell, the diaphragm assembly being movably sleeved on the valve rod, the diaphragm assembly comprising a diaphragm and an upper tray, the upper tray having a first portion that engages the diaphragm and a second portion that extends away from the first portion and toward the limiting component, the second portion of the upper tray arranged to selectively engage the limiting component to deter movement of the diaphragm assembly past a limit; and
   an elastic element disposed in the shell, the elastic element being coupled to the diaphragm assembly and being movably sleeved on the valve rod, between the diaphragm assembly and a tip of one end of the valve rod located within the shell, in a compressed state;
   wherein the limiting component is located above the diaphragm assembly and an inner diameter of a portion of the limiting component is smaller than an outer diameter of the upper tray of the diaphragm assembly.

2. The actuator according to claim 1, wherein the limiting component is a protruding portion or a reinforcing rib.

3. The actuator according to claim 1, wherein the diaphragm assembly further comprises a lower tray fixed to a lower side of the diaphragm.

4. The actuator according to claim 3, wherein the lower tray has an inverted T-shape in cross-section, a central through hole is formed in the lower tray, the diaphragm and the upper tray are fixedly sleeved on an outer side of the central through hole, and the diaphragm assembly is movably sleeved on an outer side of one end of the valve rod via the central through hole.

5. The actuator according to claim 3, wherein a boss is disposed on the valve rod, an upper portion of the boss is located in the shell and on a lower side of the diaphragm assembly, and the lower tray is in contact with the boss.

6. The actuator according to claim 5, wherein the lower tray comprises a groove that accommodates the boss.

7. The actuator according to claim 3, further comprising:
a sealing element disposed between the valve rod and the diaphragm assembly, the sealing element being disposed in a groove formed on the valve rod or disposed in a groove formed on the lower tray.

8. The actuator according to claim 7, wherein the sealing element is a rubber component or an elastic component made of metal.

9. The actuator according to claim 1, wherein the elastic element is a spring or a component made of rubber.

10. A fluid regulator, comprising:
a valve body having an inlet, an outlet, and a fluid flow path extending between the inlet and the outlet;
a valve element assembly comprising a valve rod, a valve port arranged in the fluid flow path, and a valve flap disposed in the fluid flow path and connected to the valve rod; and
an actuator, comprising:
a shell;
a limiting component disposed on an inner wall of the shell;
a diaphragm assembly disposed in the shell, the diaphragm assembly being movably sleeved on the valve rod, the diaphragm assembly comprising a diaphragm and an upper tray, the upper tray having a first portion that engages the diaphragm and a second portion that extends away from the first portion and toward the limiting component, the second portion of the upper tray arranged to selectively engage the limiting component to deter movement of the diaphragm assembly past a limit; and
an elastic element disposed in the shell and outside of the valve body, the elastic element being coupled to the diaphragm assembly and being movably sleeved on the valve rod, between the diaphragm assembly and a tip of one end of the valve rod located within the shell, in a compressed state,
wherein the limiting component is located above the diaphragm assembly and an inner diameter of a portion of the limiting component is smaller than an outer diameter of the upper tray of the diaphragm assembly,
wherein the valve rod is movable to move the valve flap between a closed position, in which the valve flap engages the valve port, and an open position, in which the valve flap is spaced from the valve port, to control fluid flow through the fluid flow path.

11. The fluid regulator according to claim 10, wherein the limiting component is a protruding portion or a reinforcing rib.

12. The fluid regulator according to claim 10, wherein the diaphragm assembly further comprises a lower tray fixed to a lower side of the diaphragm.

13. The fluid regulator according to claim 12, wherein the lower tray has an inverted T-shape in cross-section, a central through hole is formed on the lower tray, the diaphragm and the upper tray are fixedly sleeved on an outer side of the central through hole, and the diaphragm assembly is movably sleeved on an outer side of one end of the valve rod via the central through hole.

14. The fluid regulator according to claim 12, wherein a boss is disposed on the valve rod, an upper portion of the boss is located in the shell and on a lower side of the diaphragm assembly, and the lower tray is in contact with the boss.

15. The fluid regulator according to claim 14, wherein the lower tray comprises a groove that accommodates the boss.

16. The fluid regulator according to claim 12, further comprising:
a sealing element disposed between the valve rod and the diaphragm assembly, the sealing element being disposed in a groove formed on the valve rod or disposed in a groove formed on the lower tray.

17. The fluid regulator according to claim 16, wherein the sealing element is a rubber component or an elastic component made of metal.

18. The fluid regulator according to claim 10, wherein the elastic element is a spring or a component made of rubber.

19. The actuator according to claim 1, further comprising a biasing element disposed in the shell, the biasing element having one end seated against the upper tray.

20. The fluid regulator according to claim 10, wherein the valve rod extends through the diaphragm.

* * * * *

UNITED STATES PATENT AND TRADEMARK OFFICE
CERTIFICATE OF CORRECTION

PATENT NO. : 10,443,748 B2
APPLICATION NO. : 15/500483
DATED : October 15, 2019
INVENTOR(S) : Yanwei Lei It is certified that error appears in the above-identified patent and that said Letters Patent is hereby corrected as shown below:

In the Specification

At Column 6, Line 13, "diaphragm assembly 205." should be -- diaphragm assembly 204. --.

At Column 6, Line 23, "upper tray 220)" should be -- lower tray 220) --.

At Column 6, Line 44, "valve rod 210," should be -- valve rod 212, --.

At Column 8, Line 32, "elastic member 326" should be -- elastic element 326 --.

At Column 9, Line 4, "actuator 300" should be -- actuator 301 --.

Signed and Sealed this
Twenty-seventh Day of October, 2020

Andrei Iancu
*Director of the United States Patent and Trademark Office*